(12) United States Patent
Fedorova (10) Patent No.: US 7,363,450 B1
(45) Date of Patent: Apr. 22, 2008

(54) METHOD AND APPARATUS FOR ESTIMATING MULTITHREADED PROCESSOR THROUGHPUT BASED ON PROCESSOR CACHE PERFORMANCE

(75) Inventor: Alexandra Fedorova, Lincoln, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 351 days.

(21) Appl. No.: 11/141,918

(22) Filed: Jun. 1, 2005

(51) Int. Cl.
*G06F 12/08* (2006.01)

(52) U.S. Cl. ...................... 711/167; 711/118

(58) Field of Classification Search ............... 711/167, 711/118
See application file for complete search history.

(56) References Cited

U.S. PATENT DOCUMENTS

| | | | |
|---|---|---|---|
| 5,151,981 A | | 9/1992 | Westcott et al. |
| 6,119,075 A | | 9/2000 | Dean et al. |
| 6,332,178 B1 | | 12/2001 | Dean et al. |
| 6,604,174 B1 | * | 8/2003 | Dean et al. ............ 711/131 |
| 2005/0198476 A1 | * | 9/2005 | Gazsi et al. ............ 712/228 |

OTHER PUBLICATIONS

"A Non-Work-Conserving Operating System Scheduler For SMT Processors" Alexandra Fedorova, Margo Seltzer and Michael D. Smith http://www.bioperf.org/FSS06.pdf.*
"Comprehensive Multiprocessor Cache Miss Rate Generation Using Multivariate Models" Ilya Gluhovsky and Brian O'Krafka Sun Microsystems Laboratories ACM Transactions on Computer Systems, vol. 23, No. 2, May 2005, pp. 111-145.*
"Quantitative study of data caches on a multistreamed architecture" Mario Nemirovsky and Wayne Yamamoto http://www.cs.colostate.edu/TechReports/Reports/1998/mteac98/nemirovsky.pdf.*
"A Non-Blocking Multithreaded Architecture" Krishna M. Kavi, David Levine and Ali R. Hurson http://csrl.unt.edu/~kavi/Research/adcomp-97.pdf.*
"Predicting Inter-Thread Cache Contention on a Chip Multi-Processor Architecture" Dhruba Chandra, Fei Guo, Seongbeom Kim, and Yan Solihin Proceedings of the 11th Int'l Symposium on High-Performance Computer Architecture (HPCA-11 2005).*
U.S. Appl. No. 11/141,775, filed Jun. 1, 2005.

(Continued)

*Primary Examiner*—Hyung S. Sough
*Assistant Examiner*—Kenneth M Lo
(74) *Attorney, Agent, or Firm*—Robert C. Kowert; Anthony M. Petro; Meyertons, Hood, Kivlin, Kowert & Goetzel, P.C.

(57) ABSTRACT

An estimate is calculated of the throughput of a multi-threaded processor having N threads based on measured miss rates of a cache memory associated with the processor by calculating, based on the cache miss rates a probability that the processor is in a state with one thread running, a probability that the processor is in a state with two threads are running and continuing to a probability that the processor is in a state with N threads running, multiplying each probability by a measured throughput of the processor when it is in the corresponding state and summing the resulting products. This estimate may also be corrected for bus delays in transferring information between the cache memory and main memory. The estimate can be used for thread scheduling in a multiprocessor system.

33 Claims, 9 Drawing Sheets

OTHER PUBLICATIONS

Fedorova et al., "Modeling the effects of memory hierarchy performance on throughput of multithreaded processors," Technical Report TR-15-05, Division of Engineering and Applied Sciences, Harvard University, Jun. 2005.

Sorin et al., "Analytic evaluation of shared-memory systems with ILP processors," Proceedings of the International Symposium on Computer Architecture (ISCA), 1998.

Willick et al., "An analytical model of multistage interconnection networks," Proceedings of the 1990 ACM SIGMETRICS conference on Measurement and modeling of computer systems, 1990.

Saavedra-Barrera et al., "Analysis of multithreaded architectures for parallel computing," Proceedings of the 2nd Annual ACM Symposium on Parallel Algorithms and Architectures, 1990.

Dubey et al., "Analytic Performance Modeling for a Spectrum of Multithreaded Processor Architectures," Proceedings of the 3rd International Workshop on Modeling, Analysis, and Simulation of Computer and Telecommunication Systems, 1995.

Matick et al., "Analytical analysis of finite cache penalty and cycles per instruction of a multiprocessor memory hierarchy using miss rates and queuing theory," IBM Journal of Research and Development, Nov. 2001.

Onvural, "Survey of closed queueing networks with blocking," ACM Computing Surveys, Jun. 1990.

Denning, "Thrashing: Its causes and prevention," Proc. AFIPS 1968 Fall Joint Computer Conference, 33, pp. 915-922, 1968.

Kleinrock, "Queuing systems vol. 1," Wiley, 1975, pp. 147-240.

Ian MacIntyre, et al., "The Effect of Cache on the Performance of Multi-Threaded Pipelined RISC Processor," Dept. of Electrical and Computer Engineering Univ. of Waterloo, 1991, pp. 1-8.

\* cited by examiner

METHOD AND APPARATUS FOR ESTIMATING MULTITHREADED PROCESSOR THROUGHPUT BASED ON PROCESSOR CACHE PERFORMANCE

BACKGROUND

In order to improve the performance of an important class of modern memory-intensive applications, such as web services, application servers, and online transaction processing systems, which are notorious for causing frequent processor stalls and have processor pipeline utilizations of less than 20 percent, new processor architectures are being developed. One of the more recently developed architectures placed in commercial use is a multithreaded (MT) processor. MT processors typically use on-chip processor cache memories to reduce memory latency and are further designed to hide the effects of memory latency in the cache memories by running multiple instruction streams in parallel. In particular, an MT processor has multiple thread contexts, and interleaves the execution of instructions from different threads. As a result, if one thread blocks on a memory access, other threads are still active and can make forward progress. The MT processor architecture has quickly become popular enough that the majority of new processors that are being released are multithreaded.

Understanding the relationship between the performance of the on-chip processor cache memories and the overall performance of the processor is critical for both hardware design and software program optimization. For example, due to the improvement in memory access, software designers may need to place less emphasis on optimizing their applications for high cache hit rates. Alternatively, if a dynamic estimate can be made of multithreaded processor throughput based on processor cache performance, the estimate can be used to schedule processes in a multiprocessor system.

While considerable work has been done with conventional single-threaded processors to determine the relationship between the performance of on-chip processor cache memories and the overall performance of processors, the relationship is not well understood for new multithreaded processors.

SUMMARY

In accordance with the principles of the invention, an estimate is made of the throughput of a multi-threaded processor having N threads based on measured miss rates of a cache memory associated with the processor by calculating, based on the cache miss rates a probability that the processor is in a state with one thread running, a probability that the processor is in a state with two threads are running and continuing to a probability that the processor is in a state with N threads running, multiplying each probability by a throughput of the processor when it is in the corresponding state and summing the resulting products.

In one embodiment, the throughput calculated from the cache memory miss rates is initially calculated assuming that a memory bus between the cache memory and main memory has infinite bandwidth and then the throughput estimate is later corrected for memory bus delays.

In another embodiment, the multithreaded processor has a hierarchical cache memory with a first and a second level and the processor throughput is estimated based on the miss rate of the second level of the cache memory.

In still another embodiment, the processor throughput is estimated based on both the read miss rate and the write miss rate of the second level of the cache memory.

In yet another embodiment, the effect of a write buffer on the cache memory write miss rate is taken into consideration by using a multiplier whose value is based on the writes per cycle rate.

In another embodiment, the probability that the processor is in a state with a given number of threads running is based on the miss latency of the second level of the cache memory.

In another embodiment, the throughput of the processor when it is in a state with a given number of threads running is determined by fitting an equation to data relating the processor throughput to the number of threads running and the ideal processor throughput obtained with a cache memory of infinite size.

DETAILED DESCRIPTION

Figure 1:
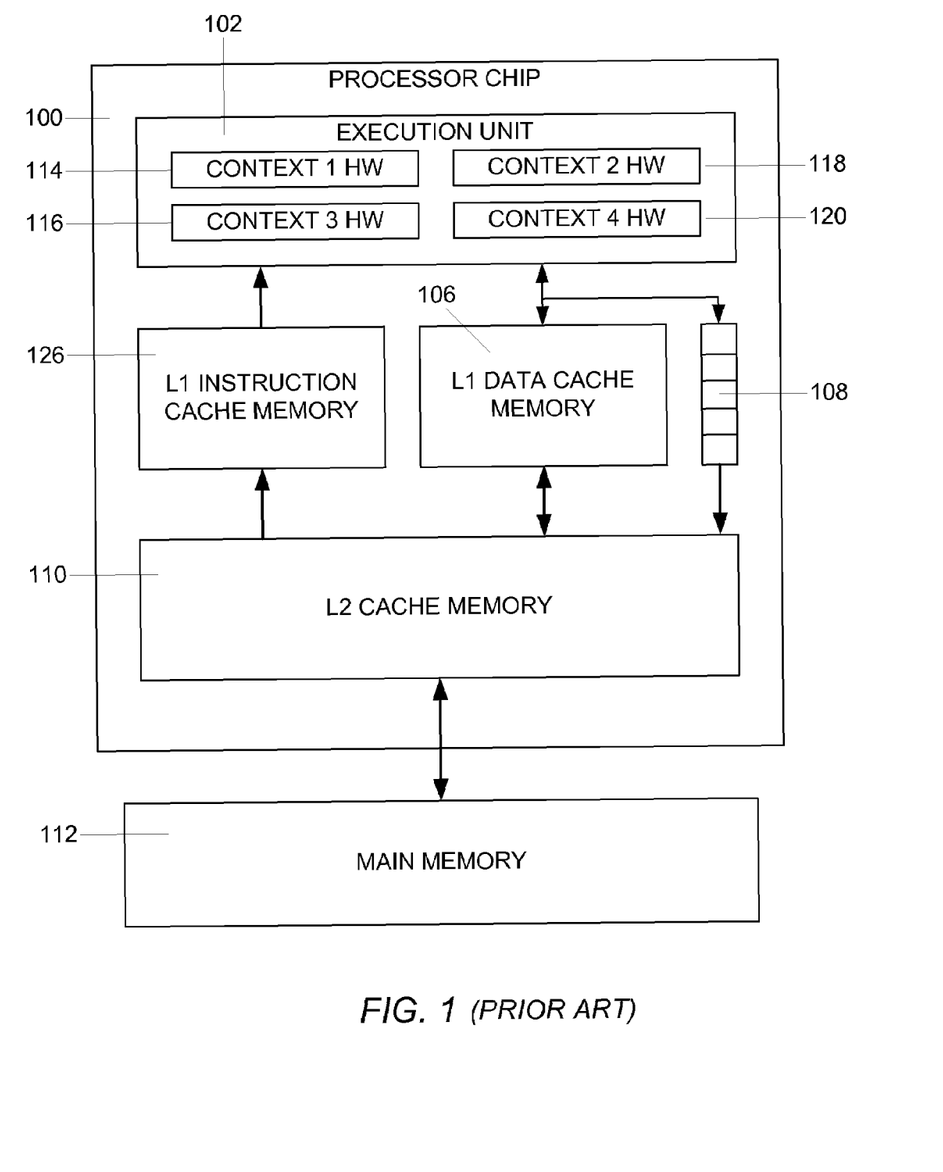
FIG. 1 is a block schematic diagram illustrating an illustrative processor architecture showing a two level cache memory system with a write buffer.

The basic processor architecture used for simulation and the development of the estimate is shown in FIG. 1. Although a specific processor architecture is shown, those skilled in the art would understand that various modifications can be made to this architecture and that other architectures can also be used. The processor chip 100 has an execution unit 102 and a two-tier cache memory system on the chip. The cache memory system comprises a level one (L1) instruction cache memory 126, an L1 data cache memory 106 and a level two (L2) cache memory 110. Typically, a request for data or an instruction is first made to one of the L1 cache memories 106 and 126, respectively. If the requested information is not found in an L1 cache memory (termed an L1 "miss" or an L1 "fault") then a further request is made to the L2 cache memory 110. If an L2 cache miss occurs, then the main memory 112 is accessed. Writes to the cache are assisted by means of a write buffer 108.

The hardware illustrated in FIG. 1 can be used with many types of fine-grained multithreading, such as interleaving or simultaneous multithreading (SMT). In a multi-threaded system, the processor has several hardware thread contexts 114-120, where each context consists of a set of registers and other thread state mechanisms. The processor either issues instructions from multiple threads on each cycle or interleaves the execution of instructions from the threads, switching between contexts on each cycle in a round-robin fashion. When one or more threads are blocked, the processor continues to switch among the remaining available threads. If there is no thread that is ready to issue an instruction, the processor stalls, waiting for some thread to become ready. For purposes of illustration, a simple RISC pipeline with one execution unit 102 (i.e., arithmetic logical unit, instruction fetch unit, etc.) is shown. However, similar estimates can be made with more complex pipelines in cases where the lower levels of cache memory are modeled where miss latencies are large.

In order to measure processor throughput, a metric called "instructions per cycle" (IPC) is used. This metric was chosen because it is important for long-running throughput-oriented workloads, such as application servers and databases, whose performance is often expressed as the sustained number of requests per second—the quantity that is ultimately linked to processor IPC. Similarly, to measure cache hierarchy performance, the cache miss rate—the number of cache misses per instruction—is used. Therefore, the estimate generated is in terms of processor IPC for a given cache miss rate. An assumption is made that both the L2 cache memory read-miss rate (including both data and instruction misses) and the L2 cache memory write-miss rate can be measured. For example, these quantities can generally be measured by reading hardware performance counters usually available on modern processors It has been found that multithreaded processors are able to effectively hide latency from faults in the L1 cache memory, however poor performance in the L2 cache memory can adversely affect processor IPC. This implies that variation in the L2 cache memory miss rates produces greater variation of processor IPC than variation in the L1 cache memory miss rates. Although the estimate developed below is based on the effects of L2 cache memory miss rates on processor IPC, the same methodology can also be used for other levels of the cache hierarchy, such as L1 or L3 cache memories.

As a starting point, the effects of L2 cache memory misses for a single threaded workload are determined. In order to do this, an assumption is made. In the real world, the performance of the L2 cache memory is only one factor that affects processor IPC. For example, processor IPC is determined by a multitude of other factors, such as the architecture of the processor pipeline, the instruction mix of the workload, and the performance in the L1 cache memory level. These latter factors greatly increase the complexity of determining the estimate. Therefore, to simplify the determination, an assumption is made that a processor reaches its "ideal" IPC for a given workload when there are no capacity or conflict misses in the L2 cache memory. In other words, a workload experiences its ideal IPC when it runs with an infinitely large L2 cache memory. Using this assumption is a standard approach when modeling the effects of memory hierarchy on the overall performance. The ideal IPC for a particular architecture, such as that illustrated in FIG. 1, can be determined by simulating the processor in a conventional fashion and using an L2 cache memory with infinite size.

The first step is to determine the L2-miss latency for a single-threaded workload. Later a determination will be made how a multi-threaded processor hides such single-thread latencies. The estimate that is determined is latency per instruction: how many cycles per instruction a thread spends handling L2 cache memory misses. The following definitions are used:

L2_CPI—Per-instruction L2-miss latency. For a given L2 cache memory miss rate, the number of cycles per instruction that a thread is blocked handling misses in the L2 cache memory.

ideal_CPI—the inverse of ideal IPC as defined above;

CPI—cycles per instruction given some L2 cache memory miss rate;

L2_MR—Number of L2 cache memory misses per instruction—this includes the read-miss rate and the write-miss rate.

L2_MCOST—the cost, in cycles, of handling each miss in the L2 cache memory, which is the cost of going to main memory from the L2 cache. In determining this value an initial assumption is made that the bandwidth of the memory bus between the L2 cache memory and main memory is infinite, so there is no delay associated with waiting for the memory bus when an L2 cache memory miss occurs and information must be retrieved from the main memory. Later, as discussed below, adjustments are made for a finite memory bus bandwidth. Without any bus delay, the parameter value can be determined by examining the processor architecture and the cache memory control program. With this initial assumption, an exemplary value for this parameter is 120 cycles.

With these definitions the value of L2_CPI depends on the L2 cache memory miss rate and the cost of each miss:

$$L2\_CPI = L2\_MR * L2\_MCOST \quad (1)$$

In addition, the thread's CPI is comprised of its ideal CPI and the CPI that is due to handling the misses in the L2:

$$CPI = ideal\_CPI + L2\_CPI \quad (2)$$

If a workload is multithreaded, there is also a cost associated with waiting for a cache line if it is in use when the thread accesses it. However, is has been observed from performance data that this cost does not have a high impact on performance, so for further calculations, it will be disregarded altogether. Further there is no accounting for communication costs associated with a cache consistency protocol. This would be relevant for systems with multiple caches on the same level of the memory hierarchy. A model for such costs is well-known and can be easily incorporated into these calculations, if needed.

In the simplest case, equation (1) above can be used to compute the L2 cache memory miss latency given a particular L2 cache memory miss rate. This approach works with a write-though cache and a processor that is not equipped with a write buffer. However, in a more sophisticated system with a write-back cache and a write buffer, this simple approach does not work well because writing in the cache memory creates dirty cache lines that need to be written back and these write backs may increase the cost a of a cache memory miss. A write buffer can absorb the write misses, making them non-blocking. Therefore, a write miss does not necessarily stall the thread. The effects of write-backs and the write buffer are treated below.

More particularly, a write-back transaction occurs whenever the cache memory must evict a dirty cache line. For example, if a read transaction misses in the cache memory and the cache line involved in the read transaction is dirty, this line will be written to main memory before it is used. In this case, a read transaction incurs an additional penalty of L2_MCOST. Therefore, in order to fully account for all memory-access penalties, the L2 miss rate must include write-back transactions. In many cases, the rate of write-back transactions can be measured by reading hardware counters. However, for situations when the write-back rate cannot be directly measured, it can be estimated. In particular, the write back rate depends on the cache memory write miss rate because it is the write misses that create dirty cache lines. Linear regression analysis can be used on performance data to analyze the relationship between the write-miss rate and the write-back rate, to obtain a linear model with a good fit. An exemplary equation that can be used to estimate the write-back rate is:

$$0.03-0.0000008*(WR\_MISS)+0.0000057*(WR\_MISS)*(FRAC\_WR\_MISS)$$

where WR_MISS is the number of write misses per 100 million instructions and FRAC_WR_MISS is the fraction that write misses constitute of all misses. Using this model, it is possible to estimate the write-back rate of a workload to within 22% of actual values.

Some write-back transactions are triggered during read-miss transactions. Other write-back transactions are triggered during write-miss transactions. As will become evident below, the read miss rate and the write miss rate must be distinguished. Therefore, write-back transactions that are caused by read transactions must be distinguished from write-back transactions caused by write transactions. As expected, this fraction is proportional to the fraction that the read- or write-miss rate contributes to the overall miss rate. For example, if read misses constitute 60% of all misses, then about 60% of all write-backs are triggered by read-miss transactions, and so 60% of the write-back rate should be included in the read miss rate.

A write buffer cushions the effect of write misses: when a thread performs a write, the value is placed into the buffer, and the transaction completes immediately. The written values are propagated through the memory hierarchy asynchronously, without stalling the thread. The only time a write can stall the thread is when the write buffer becomes full—in this case the thread waits until some space becomes available in the write buffer.

As shown in FIG. 1, the write buffer 108 is shared among threads that run on the processor. The write buffer 108 is positioned above the L1 data cache 106. The L1 cache 106 in this system is non-write-allocate—it does not allocate space in the memory 106 in the event of a write miss. Therefore, all writes from the write buffer 108 go directly to the L2 cache memory 110. As a result, the L2 cache memory 110 performance affects the likelihood of the write buffer stalling the processor.

Queuing theory provides a natural approach to modeling the effect of a write buffer. A write buffer can be modeled as a server, and threads that send write requests as customers. Using a closed network queuing model with limited buffer size, it is possible to estimate the delay associated with filling the buffer. However, because solving such a model is computationally expensive and it is desired to perform the calculations dynamically (for example, in a runtime scheduler), and because our model showed little sensitivity to this effect, the following simplified approach is used instead of queuing theory.

Specifically, an estimate is made of the fraction of L2 write misses that are not absorbed by the write buffer and therefore eventually stall the processor. This quantity depends on the write miss rate that a workload generates. The more writes that miss in the cache the longer it takes for the write buffer to propagate the writes and the more likely it is to fill.

For the architecture of FIG. 1, it has been determined from performance data obtained by simulating the processor that, with a workload having a writes per-cycle rate of roughly 6,000 per million cycles or greater, about 90% of the L2 write misses stall the processor. At any rate less than that only about 5% of L2 write misses stall the processor. These numbers can be used to augment equations (1) and (2) above by splitting the L2 miss rate (L2_MR) into two parts: an L2 read miss rate (L2_RMR) and an L2 write miss rate (L2_WMR). The read miss rate includes both data reads and instruction fetches. Equation (1) now becomes:

$$L2\_CPI=(L2\_RMR+L2\_WMR)*L2\_MCOST \quad (3)$$

For workloads whose writes-per-cycle rate is above 6,000 per million cycles, the term L2_WMR is multiplied by 0.9 in order to reflect that, for such workloads, about 90% of L2 write misses stall the processor. Similarly, for workloads whose writes-per-cycle rate is lower, the term L2_WMR is multiplied by 0.05 to reflect that, for such workloads only about 5% of L2 write misses stall the processor. This multiplier is termed the WMM—the write miss multiplier. In order to derive the WMM coefficient for a particular architecture, it is necessary to characterize the effect of write miss rate on the write buffer on that architecture. Equation (3) now becomes:

$$L2\_CPI=(L2\_RMR+L2\_WMR*WMM)*L2\_MCOST \quad (4)$$

Equation (4) expresses the desired estimate of processor CPI based on cache memory misses when the processor is executing a single-threaded workload and all cycles spent handling L2 cache memory misses stall the processor. However, with a multithreaded workload, the processor hides the memory-access latencies of individual threads by running the threads in parallel. While a particular thread may be stalled on a cache miss, the processor could still be running, because there may be other threads that are not stalled. Therefore, only a fraction of all cycles spent handling L2 misses by individual threads stall the processor. This latency-masking effect can be taken into effect by using knowledge of how much time each individual thread stalls, and determining how this stall time overlaps with the non-stall time of the other threads. Then, the effect of L2 miss rate on processor IPC can be estimated.

The key to understanding how the processor masks individual thread memory latencies is the notion of the probability that an individual thread is blocked on an L2 cache memory miss, termed the thread-block probability. The thread-block probability can be derived by examining how the thread spends its cycles during execution. The ideal_CPI is the number of cycles (per instruction) that the thread spends doing useful work. The L2_CPI value from equation (4) is the number of cycles that a thread spends handling L2 cache misses. From these two values the fraction of all cycles the thread spends blocked, handling L2 misses can be determined. This fraction is the thread-block probability. Although the probability is derived from per-instruction quantities, the fact that an instruction may require varying number of cycles to complete depending on its type and that some instructions may not stall at all is not of concern because the objective is to derive a rough probability of a thread being in the blocked state.

While it is sufficient to use the ideal_CPI of a thread to derive the thread-blocked probability for a single-threaded workload, for a multithreaded workload the ideal_CPI of a multithreaded workload must be used. When threads share the processor pipeline, they sometimes have to wait for their turn to use it. Therefore, each thread runs more slowly than it would have if it had exclusive use of the pipeline, and the ideal_CPI of an individual thread increases, reflecting this competition. The ideal_CPI of a multithreaded workload, ideal_CPI_mt, is defined as the CPI of a multithreaded workload that the processor achieves under no conflict- or capacity-misses in the L2. As with the ideal_CPI value discussed above the ideal_CPI_mt value can be determined by simulating the processor architecture with an L2 cache memory of infinite size.

With this latter value, the ideal CPI that an individual thread achieves when it shares the processor with the other threads (ideal_CPI_ind) can be determined as follows:

$$ideal\_CPI\_ind = ideal\_CPI\_mt * M \quad (5)$$

where M is the number of thread hardware contexts on the processor. To understand the ideal_CPI_ind can be computed in this manner, consider how threads share the pipeline on the processor with four hardware contexts as illustrated in FIG. 1. The processor issues instructions from one thread at a time, switching between the threads on every cycle in a round robin fashion. Therefore, for each cycle that a thread spends doing useful work, it has to spend three cycles waiting while other threads are using the processor. This is reflected in equation (5) by multiplying the ideal_CPI_mt by the number of thread contexts M.

The ideal_CPI_ind is the number of cycles per instruction that each thread spends doing useful work in a multithreaded scenario. If the L2 miss rate for the multi-threaded workload is known and assuming that all threads equally contribute to the overall miss rate, the thread-blocked probability for the multithreaded scenario (prob_blocked_ind) can be computed as a function of the L2 cache memory miss rate as follows:

$$prob\_blocked\_ind = \frac{L2\_CPI}{ideal\_CPI\_ind + L2\_CPI} \quad (6)$$

Note that in equation (6) the value L2_CPI from equation (4) is used without modification. If all threads equally contribute to the overall L2 miss rate, their individual misses-per-instruction are the same as the misses per instruction for the entire processor. In particular, each thread handles 1/Mth of all misses, but it also executes only 1/Mth of all instructions; this assumes that all threads equally contribute to the overall miss rate. Theoretically, when several threads share a cache, some threads may have worse cache locality than others and those threads could contribute more to the overall cache miss rate. However, distinguishing between different blocked probabilities of threads complicates calculation of the estimate and does not significantly increase accuracy. Therefore, a simplifying assumption is made that all threads have the same probability of being blocked.

The prob_blocked_ind value can then be used to estimate the processor IPC for a multithreaded workload. When modeling how the multithreaded processor hides individual-thread memory latencies, it is assumed that all threads have equal probabilities of being blocked and these probabilities equal prob_blocked_ind. This assumption is discussed in detail below. If M is the total number of threads on a multithreaded processor, when executing a multithreaded workload where each thread periodically blocks on an L2 cache memory miss, the processor can be in one of the following M+1 states:

(0) All M threads are blocked, none are running;

(1) Exactly one thread is running—the rest are blocked;

(2) Exactly two threads are running—the rest are blocked;

. . .

(M) All threads are running—none are blocked.

In State M, the processor is running at an IPC equal to ideal_IPC_mt (the inverse of ideal_CPI_mt). In State 0, the processor is running at IPC equal to zero—when all threads are blocked it is not completing any instructions. When some threads are running and some are blocked, the processor is running at some IPC that is less than ideal_IPC_mt. This latter quantity is termed i_IPC, where i corresponds to the number of threads that are running. For example, on a machine with four threads, when exactly three threads are running and one is blocked, the processor is running at 3_IPC.

Knowing the probability that an individual thread is blocked, and defining the corresponding probability that a thread is running (prob_running_ind) as:

$$prob\_running\_ind = 1 - prob\_blocked\_ind,$$

we can compute probabilities P that a processor is in any of the states described above based on the L2 cache memory miss rate as follows:

$$P(i) = \binom{M}{i} * prob\_running\_ind^i * prob\_blocked\_ind^{M-i} \quad (7)$$

where i is the number of threads that are running in this state and $$\binom{M}{i}$$

is the number of ways i threads can be selected from M threads.

Then, we can compute the IPC of a multithreaded workload (IPC_mt) for a given L2 miss rate by multiplying the IPC achieved in each state by the probability of that state, and summing across all states, as follows:

$$IPC\_mt = \sum_{i=0}^{M} P(i) * i\_IPC \quad (8)$$

Using the model described by equation (8) requires knowing i_IPC. It was observed that those thread groups whose ideal_IPC_mt is high ("fast threads") are better able to take advantage of free resources than thread groups whose ideal_IPC_mt is low ("slow threads"). Therefore, fast threads achieve an i_IPC value that is closer to their ideal_IPC_mt than do slow threads. Thus, i_IPC is determined as a function of ideal_IPC_mt and the number of running threads (i). This function was determined from performance data either measured directly from an actual processor or derived from simulation of a given processor architecture. A relationship is developed by fitting a linear equation to the data using regression analysis. The following formula derived from performance data produced by simulating the processor architecture illustrated in FIG. 1 resulted in a good fit (R-squared of 90%) and describes the relationship among these quantities:

$$i\_IPC = -0.69 + 0.2*i + 0.94*ideal\_IPC\_mt \quad (9)$$

It should be noted that this approach to determining i_IPC is architecture dependent. Equation (9) is not accurate across different processor architectures, because the extent to which the IPC is affected when some hardware contexts are left unused greatly depends on how the processor schedules instructions, how many functional units it has and other considerations. Therefore, the relationship between ideal_IPC and i_IPC needs to be derived for a given microprocessor.

As previously mentioned, an initial assumption was made that in estimating L2_MCOST or the cost, in cycles, of handling each miss in the L2 cache memory, the bandwidth of the memory bus between the L2 cache memory and main memory is infinite. The effect of a finite bus bandwidth is now considered. In estimating this effect, the memory system is represented as a server that answers requests for values stored in main memory. In the architecture illustrated in FIG. 1, there are five concurrent streams of memory requests originating from four instruction streams generated by the hardware contexts 114-120 and the write buffer 108.

Figure 2:
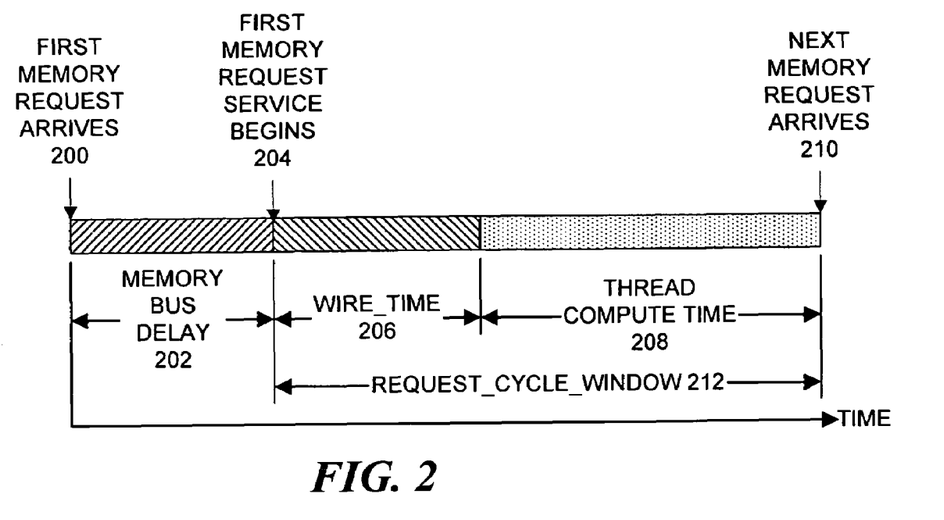
FIG. 2 is a block schematic diagram illustrating the relationship between various bus activities and the request cycle window.

For purposes of this computation, these request originators are called "threads", and the number of request originators is referred to as NUM_THREADS. FIG. 2 illustrates the basic timing involved when a thread makes a memory request. Having sent a first memory request 200, a thread spends some time waiting for the memory bus to become available (called the "memory-bus delay" 202) and servicing of the first request begins at 204. Once the bus becomes available, the thread reserves it for a period of WIRE_TIME cycles 206. The WIRE_TIME is dependent on the memory bandwidth and is illustratively set to a value of 80 to correspond to a memory bandwidth of 1 GB/s. Once the request has been serviced, the thread computes for a while 208 until it needs to send another request. The combination of WIRE_TIME and compute time is called the "request cycle window" 212 (REQUEST_CYCLE_WINDOW). The request cycle window 212 is the number of cycles that passes between the point in time 204 when a request begins being serviced and the arrival of the next memory request 210.

The size of the REQUEST_CYCLE_WINDOW for each thread determines the intensity of competition for the memory bus. The REQUEST_CYCLE_WINDOW expires upon the arrival of a new request to the memory system. The shorter the window is, the more often it expires, the higher the request arrival rate, and the more intense the memory-bus competition. Since WIRE_TIME time interval 206 is fixed, the size of REQUEST_CYCLE_WINDOW is determined by the compute time 208—the time that the thread spends away from the memory bus. The greater this time the less the competition for the memory bus, and vice versa.

The REQUEST_CYCLE_WINDOW is equivalent to the number of cycles that pass between the arrivals of two subsequent memory requests from the same thread when there are no memory-bus delays. We can compute this quantity using the IPC model that assumes an infinite memory bandwidth as set forth in equation (8). Using the number of misses per instruction and the estimated IPC_mt, we can compute the number of misses per cycle. The inverse of misses-per-cycle is the number of cycles between two subsequent misses (i.e. arrivals)—this is the REQUEST_CYCLE_WINDOW. We use the following equation to compute the number of misses per cycle $$L2\_MR\_CC = \frac{(L2\_RMR + L2\_WMR) * IPC\_mt}{NUM\_THREADS} \quad (10)$$

where L2_RMR and L2_WMR are the L2 cache memory read miss rate and the L2 cache memory write miss rate (defined above) and IPC_mt is the IPC for the multithreaded processor as set forth in equation (8). The quantity in the numerator is divided by the number of threads in order to compute the number of misses per cycle for a single thread. The following equation can be used to compute the size of REQUEST_CYCLE_WINDOW:

$$REQUEST\_CYCLE\_WINDOW = 1/L2\_MR\_CC \quad (11)$$

The memory-bus delay is determined from the point of view of an individual thread, t0, and an assumption is made that all threads experience the same delays. In particular, if all other threads send their requests at the same non-bursty rate as thread t0, those requests will arrive to the memory system sometime during the REQUEST_CYCLE_WINDOW associated with the t0 thread. As a result, the amount of time that t0 has to wait for the memory bus once its REQUEST_CYCLE_WINDOW expires depends on a) the size of REQUEST_CYCLE_WINDOW and b) the position in this window at which the other requests arrive. Intuitively, if the other threads' requests arrive early in the t0 window, they may have time to finish before the t0 window expires (if the window is large enough). In this case, the t0 thread will not have to wait for the memory bus when it sends its next request. If the other requests arrive late, on the other hand, then they will not finish before the t0 window expires, and the t0 thread will need to wait before its memory request is serviced.

In order to take the arrival time of other requests into consideration, the REQUEST_CYCLE_WINDOW is divided into two portions: a "top portion" and a "bottom portion", where the top portion corresponds to an early arrival of the other thread requests, and the bottom portion corresponds to a late arrival. The memory-bus delay is determined by estimating the wait times for the top and bottom portions, computing the probabilities that a request arrival falls into a particular portion, and then weighting the delay in each portion by its respective probability.

Figure 3A:
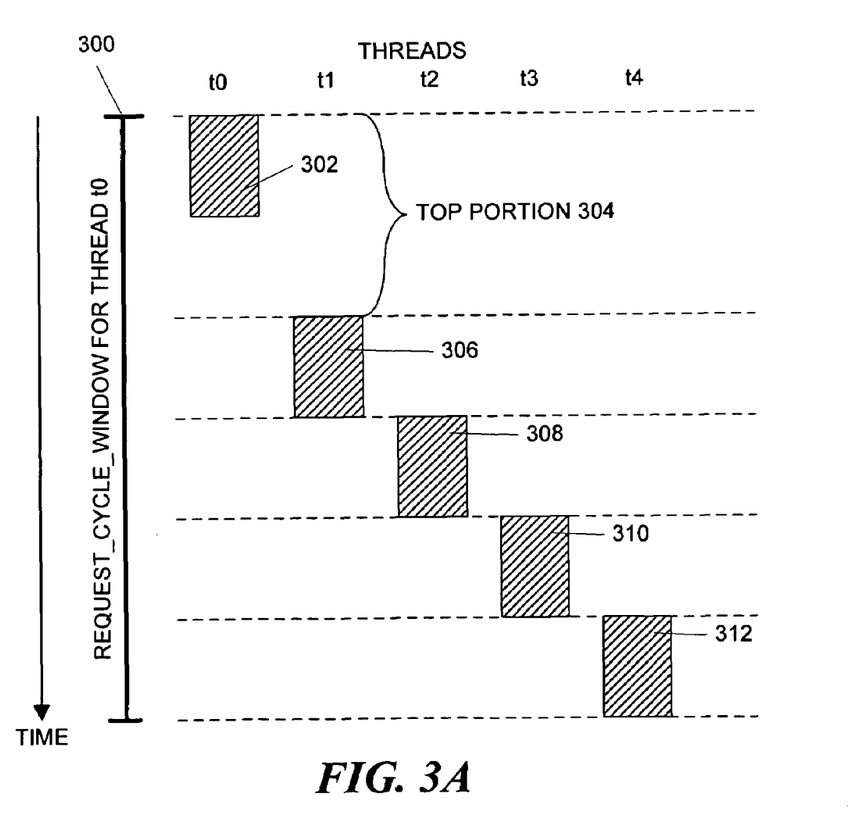
FIG. 3A is a chart indicating the result of memory requests made by a plurality of threads near the beginning of a top portion of the request cycle window for one thread.
Figure 3B:
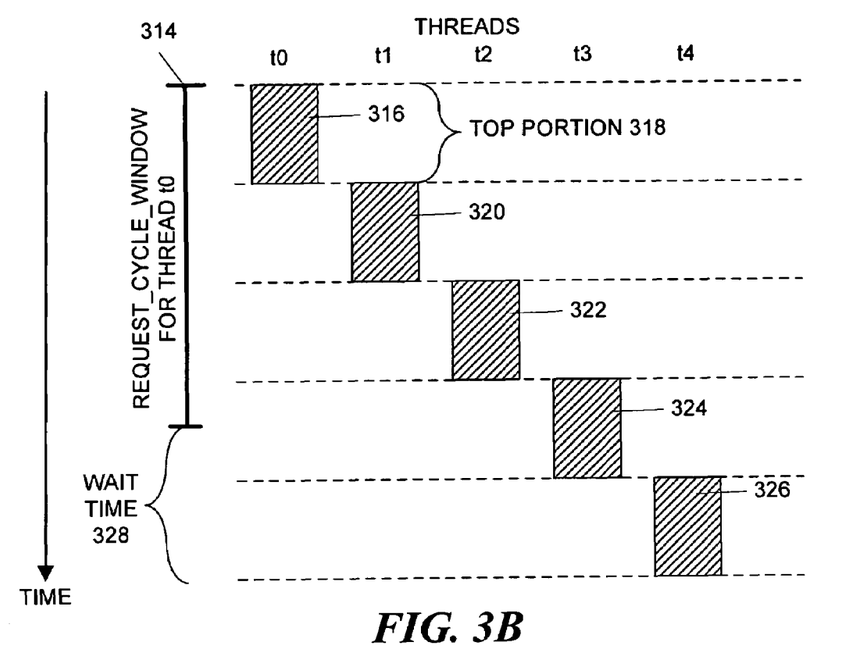
FIG. 3B is a chart indicating the result of memory requests made by a plurality of threads near the end of a top portion of the request cycle window for one thread.
Figure 3C:
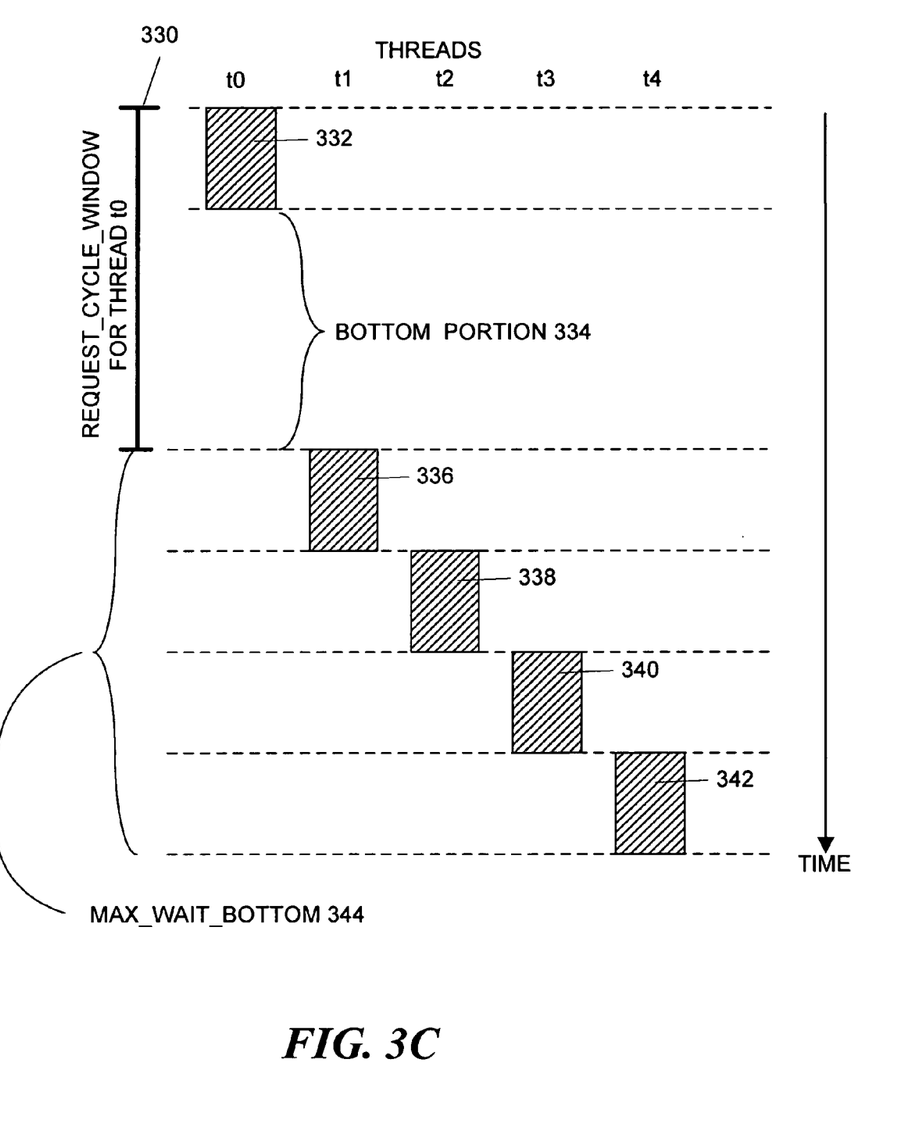
FIG. 3C is a chart indicating the result of memory requests made by a plurality of threads during the bottom portion of the request cycle window for one thread.

FIGS. 3A-3C illustrate how the REQUEST_CYCLE_WINDOW is divided into the portions and how the delays are estimated for each portion. The top portion of a REQUEST_CYCLE_WINDOW starts at the top of a REQUEST_CYCLE_WINDOW. If the REQUEST_CYCLE_WINDOW is large enough such that memory requests generated by other threads can be serviced before REQUEST_CYCLE_WINDOW expires, the top portion stretches until the latest point at which those requests must arrive so that they can be serviced and release the bus before the REQUEST_CYCLE_WINDOW expires.

FIG. 3A illustrates this case. It shows five threads t0-t4 that make memory requests. In FIG. 3A, time increases in a downward direction and a REQUEST_CYCLE_WINDOW 300 for thread t0 is illustrated. When each memory request is serviced, the associated thread will reserve the bus for the time period shown in the shaded box (the fixed WIRE_TIME). Thus, at the start of the REQUEST_CYCLE_WINDOW for thread t0, thread t0 reserves the memory bus for the WIRE_TIME 302. If the requests generated by threads t1-t4 arrive in the interval of time covered by the top portion 304 of the window 300, then each of threads t1-t4 will reserve the bus as soon as it is available. The associated times 306-312 during which each thread reserves the memory bus thus occur sequentially as shown in FIG. 3A. However, all bus reservations will expire before the end of the REQUEST_CYCLE_WINDOW 300 so that the time that thread t0 will have to wait to reacquire the bus to service its next memory request will be zero.

FIG. 3B illustrates the situation where the REQUEST_CYCLE_WINDOW 312 is not long enough to accommodate all of the memory requests generated by the other threads. FIG. 3B shows bus reservation times 316, 320, 322, 324, and 326 which correspond respectively to threads t0-t4. Illustratively, the top portion 318 covers the part of the window 314 when the memory bus is still reserved for servicing the first memory request generated by thread t0. In this case, some memory requests will be generated by the other threads late enough in the window 314 so that the memory bus will still be reserved when the window 314 expires (as shown, bus reservations 324 and 326 by threads t3 and t4). In this case, thread t0 will need to wait for the duration of time 328 equal to (WIRE_TIME*NUM_THREADS_REQUEST_CYCLE_WINDOW) before it can reacquire the memory bus to service its next request.

The wait times associated with the top portion of the window can be computed using the following formula:

WAIT_TOP=MAX(0,
  WIRE_TIME**NUM*_THREADS_REQUEST_CYCLE_
  WINDOW) (12)

As illustrated in FIG. 3C, the bottom portion 334 of a window 330 is the part of the window 330 that does not belong to the top portion 332. The minimum waiting time experienced by thread t0 to reacquire the memory bus after the expiration of bus reservations in response to memory requests generated by other threads during the bottom portion is the value of WAIT_TOP as set forth in the preceding equation because the bottom portion commences when the top portion ends. The maximum wait time (MAX_WAIT_BOTTOM 344) is illustrated in FIG. 3C and occurs if memory requests generated by the other threads arrive just before the REQUEST_CYCLE_WINDOW 330 expires. The time period 344 that thread t0 must wait in order to reacquire the memory bus in this case is equal to the total amount of time taken by reserving the bus in response to each request and is illustrated by bus reservation times 336-342 in response to memory requests from threads t1-t4 and is equal to WIRE_TIME*(NUM_THREADS-1). The minimum and the maximum wait times for thread t0 associated with memory requests from the other threads during the bottom portion is set forth below:

MIN_WAIT_BOTTOM=WAIT_TOP

MAX_WAIT_BOTTOM=WIRE_TIME*
  (*NUM*_THREADS-1).

Figure 3D:
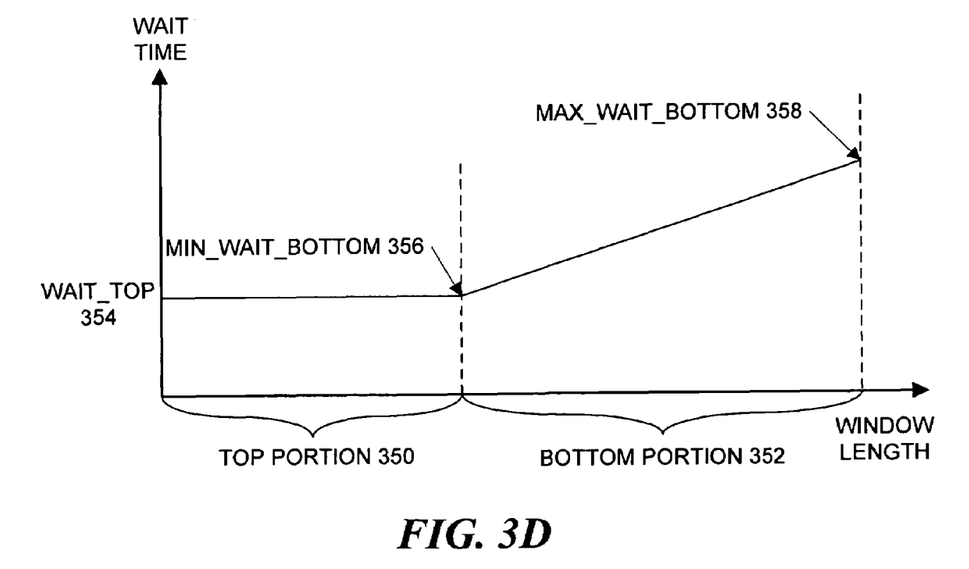
FIG. 3D is a graph that illustrates the variation in the time that a thread must wait to reacquire a memory bus after making a memory request as a function of the length of its request cycle window.

FIG. 3D illustrates the relationship between the top and bottom portions. The key distinction between the top 350 and the bottom 352 portions is that the wait time generated by requests received in the top portion 350 is fixed at WAIT_TOP 354 (the wait time WAIT_TOP 354 depends in the length of the REQUEST_CYCLE_WINDOW). In contrast, the wait time generated by requests received in the bottom portion 352 ranges between MIN_WAIT_BOTTOM 356 and MAX_WAIT_BOTTOM 358. Thus, the wait time corresponding to the bottom portion 352 is computed as the average of the minimum and maximum wait times:

$$\text{WAIT\_BOTTOM} = \text{MIN\_WAIT\_BOTTOM} + \frac{\text{MAX\_WAIT\_BOTTOM}}{2} \quad (13)$$

From the definitions of the top and bottom portions, the lengths of these portions can be easily computed as follows:

top_portion=MAX(WIRE_TIME;

REQUEST_CYCLE_WINDOW-
  NUM_THREADS*WIRE_TIME) (14)

bottom_portion=REQUEST_CYCLE_WINDOW-
  top_portion (15)

The probability of the requests arriving in a given portion is the fraction of the REQUEST_CYCLE_WINDOW that the portion occupies:

$$P(\text{arrive\_at\_top}) = \frac{\text{top\_portion}}{\text{REQUEST\_CYCLE\_WINDOW}} \quad (16)$$

$$P(\text{arrive\_at\_bottom}) = \frac{\text{bottom\_portion}}{\text{REQUEST\_CYCLE\_WINDOW}} \quad (17)$$

To compute the overall memory-bus delay per transaction (MEM_BUS_DELAY), the wait times associated with the top and bottom portions are weighted by their respective probabilities:

*MEM*_BUS_DELAY=*P*(arrive_at_top)*WAIT_TOP+
  *P*(arrive_at_bottom)*WAIT_BOTTOM (18)

where the memory bus delay quantity in equation (18) expresses the expected memory-bus delay per transaction during which an L2 cache memory miss occurs.

To factor the memory bus delay into the IPC equation (8) developed above, the cost of handling an L2 miss, L2_MCOST, is augmented by including the memory bus delay (MEM_BUS_DELAY). This changes equation (4) as follows:

L2__CPI=(L2__RMR+L2__WMR**WMM*)*(L2__
  *M*COST+*MEM*_BUS_DELAY) (19).

This version of L2_CPI, is then substituted into equation (6) which is then used in equation (8) to estimate the corrected value of IPC_mt. Note that the REQUEST_CYCLE_WINDOW value is not recalculated from the corrected value of the IPC_mt, the REQUEST_CYCLE_WINDOW value is only calculated from the value of IPC_mt determined assuming an infinite bandwidth for the memory bus.

Figure 4A:
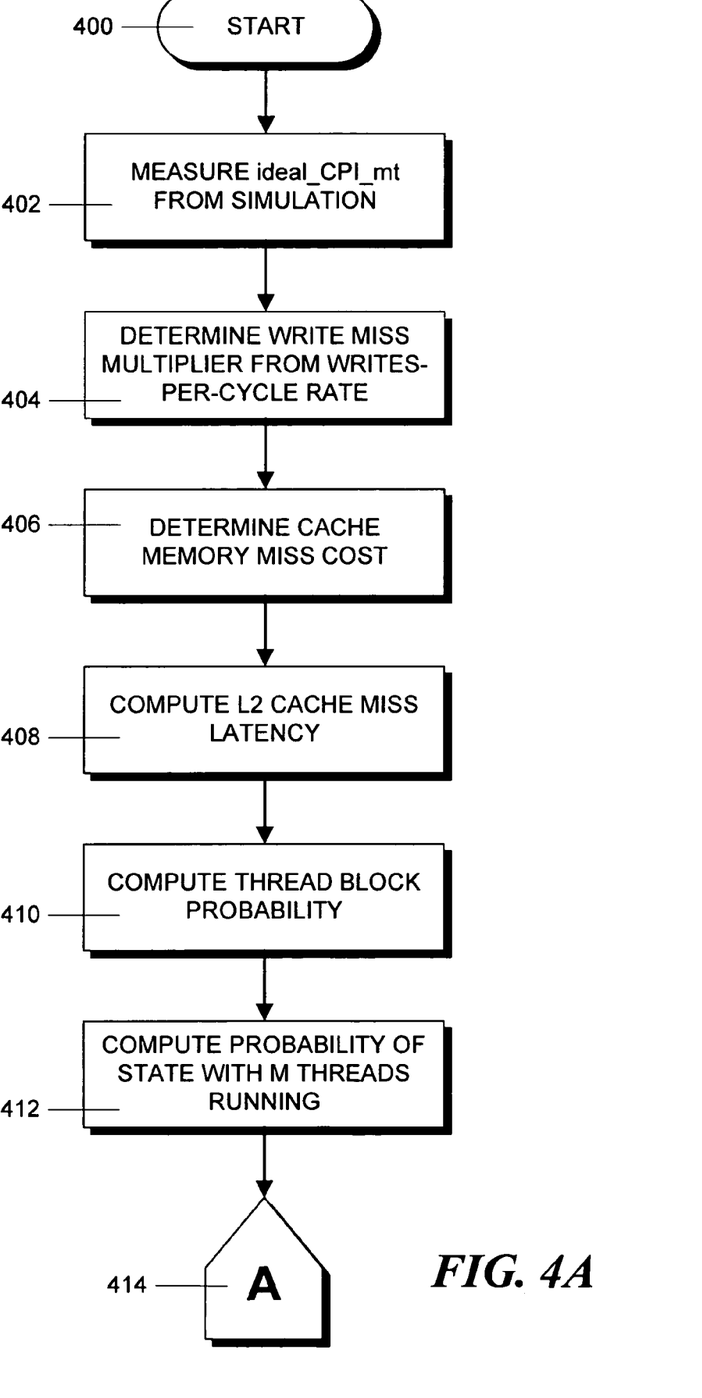
FIGS. 4A and 4B, when placed together, form a flowchart showing the steps in an illustrative process for estimating processor throughput based on L2 cache memory miss rate.
Figure 4B:
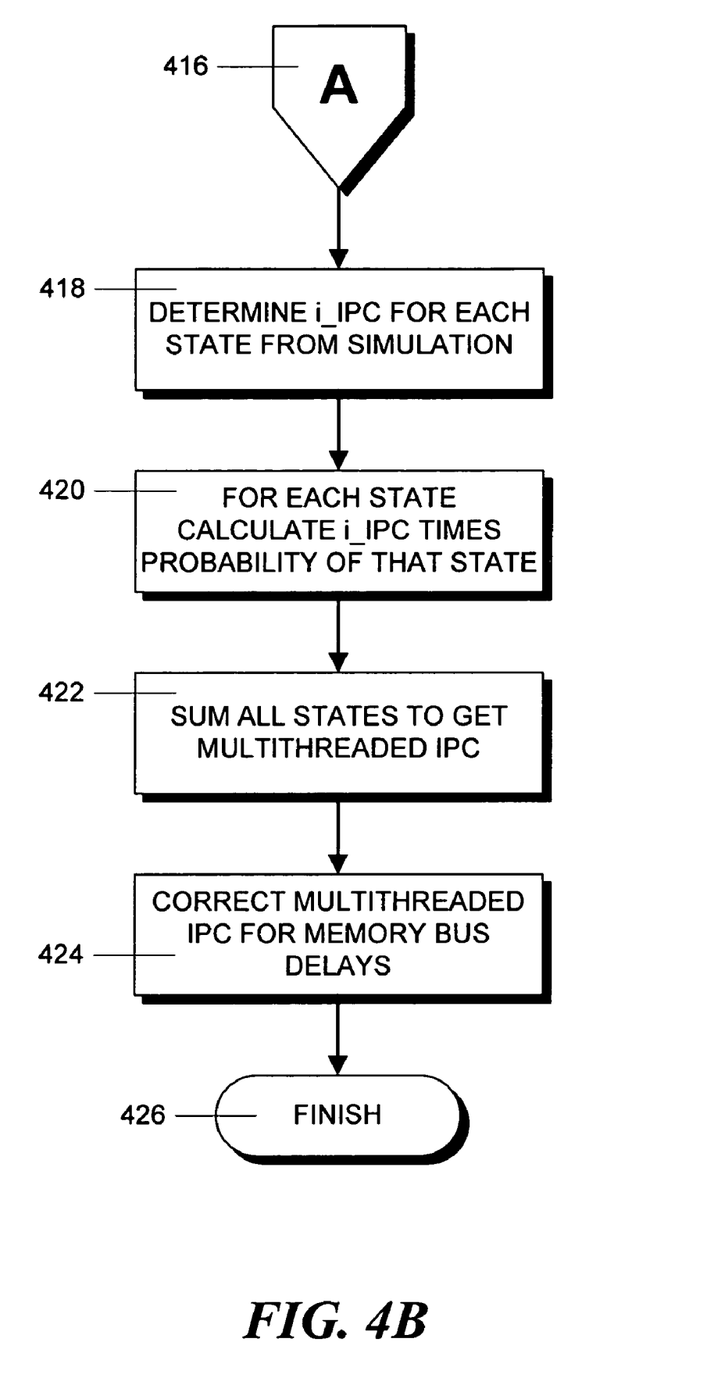
Figure 6:
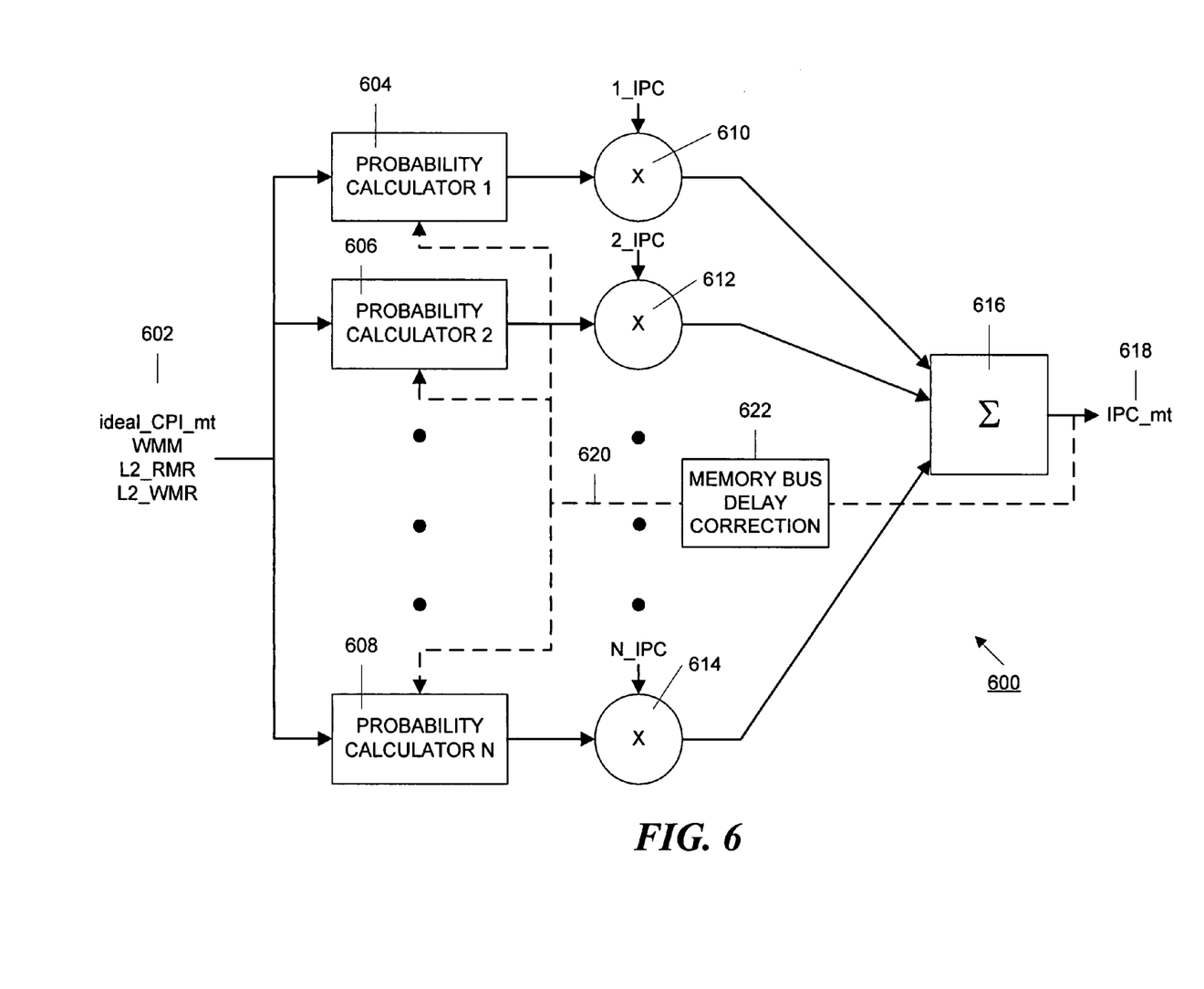
FIG. 6 is a block schematic diagram of an illustrative apparatus for calculating multithreaded processor throughput in accordance with the principles of the invention.

The overall process of generating the estimate is shown in the flowchart formed by placing FIGS. 4A and 4B together and uses an illustrative apparatus as shown schematically in FIG. 6. This process starts in step 400 and proceeds to step 402 where the value of ideal_CPI mt is measured from a simulation of the processor architecture. Then, in step 404, the write miss multiplier, WMM, is determined from the writes per cycle rate for the processor architecture. As shown in FIG. 6, these quantities 602, along with the L2 cache memory read miss rate (L2_RMR) and the L2 cache memory write miss rate (L2_WMR) are provided as inputs to a set of probability calculators 604-608 that are part of an apparatus 600 for calculating multithreaded processor throughput. The probability calculators perform steps 406-412 shown in FIG. 4. In step 406, the L2 cache miss memory cost, L2_MCOST is determined by examining the processor architecture and the cache memory control program. The values determined in steps 404 and 406 are then used to calculate the L2 cache memory miss latency, or the number of cycles incurred when an L2 cache memory miss occurs (L2_CPI), using equation (4) as set forth above.

Next, in step 410, the thread block probability prob_blocked_ind is determined using the values measured or calculated in steps 402 and 408 in question (6) set forth above. In step 412, the probability of the processor being in a state with M threads is determined from equation (7). The process then proceeds, via off-page connectors 414 and 416, to step 418 where the IPC for each state is determined by measuring an actual processor or deriving data from a simulation as set forth by equation (9). In step 420, the probability of being in a state with i threads running time multiplied by the IPC for that state (P(i)*i_IPC) is determined for each possible processor state. Then, in step 422, the multithreaded IPC (IPC_mt) is determined by summing the values calculated in step 420 for all possible states as set forth in equation (8) and as performed by the adder 616. Finally, in step 424, the multithreaded IPC is corrected for memory bus delays by providing the multithreaded IPC to a memory bus delay corrector 622 that calculates an estimated memory bus delay based on the multithreaded IPC. This value is provided to the probability calculators 604-608 as indicated schematically by arrow 620. Then steps 408-422 are repeated substituting equation (19) for equation (4). The process then finishes in step 426.

Figure 5:
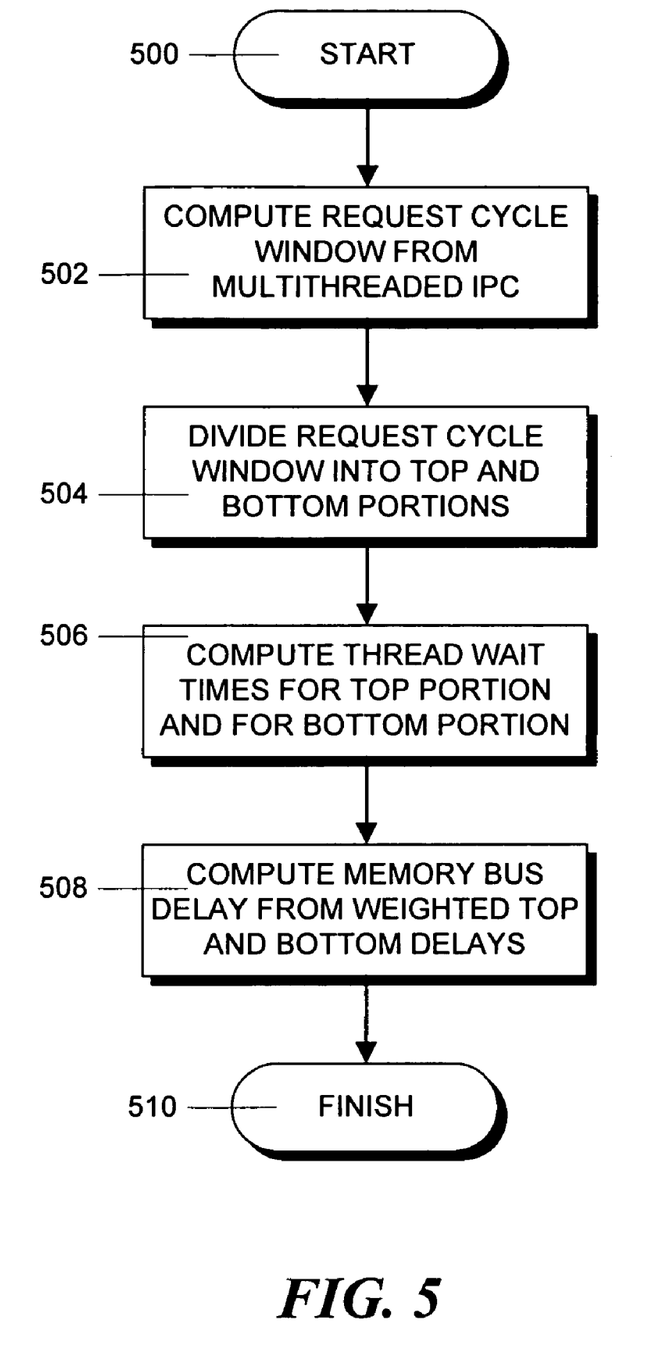
FIG. 5 is a flowchart showing the steps in an illustrative process for computing the multithreaded memory bus delay from the multithreaded IPC, the time that each thread reserves the memory bus and the L2 cache memory read and write miss rates.

FIG. 5 is a flowchart that illustrates the steps in a process for calculating the correction to the multithreaded IPC for memory bus delays. This process begins in step 500 and proceeds to step 502 where a value for the REQUEST_CYCLE_WINDOW variable is computed from the IPC_mt and the read miss rate and write miss rate of the L2 cache memory in accordance with equations (10) and (11). Next, in step 504, the REQUEST_CYCLE_WINDOW is divided into a top portion and a bottom portion in accordance with equations (14) and (15). In step 506, the wait times for a thread to reacquire the bus created by requests by other threads to reserve the bus are determined in accordance with equations (12) and (13). In step 508, the overall multi-threaded bus delay is computed by weighting the top and bottom delays in accordance with equations (16)-(18). The process then finishes in step 510.

Figure 7:
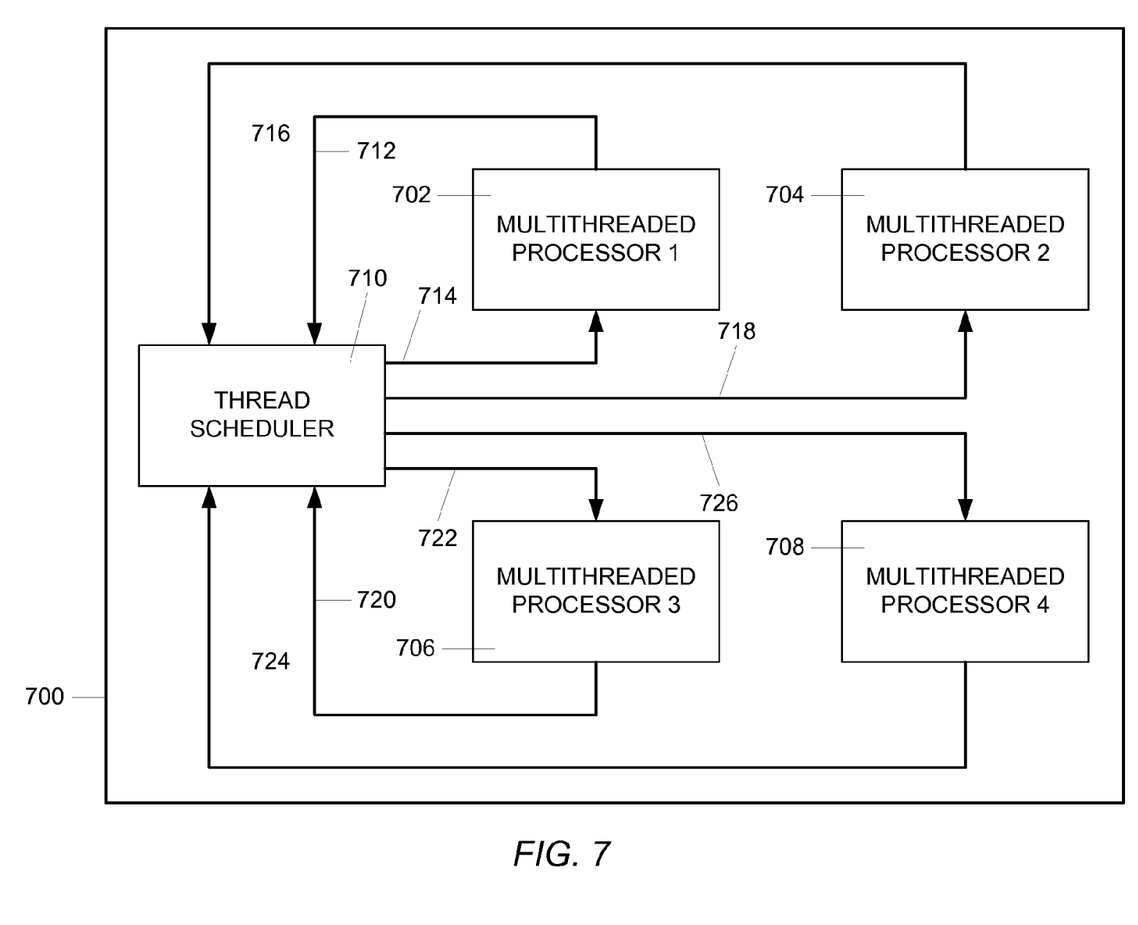
FIG. 7 is a block schematic diagram of a thread scheduler that uses the estimate generated by the process illustrating in FIGS. 4A and 4B.

FIG. 7 illustrates how the estimate generated in accordance with equation (8) as corrected for the multithreaded bus delay is used in a multiprocessor system to schedule processes in order to maximize overall throughput. In FIG. 7, the multiprocessor configuration 700 is illustrated as including four multithreaded processors 702-708. Each of processors 702-708 could have the architecture illustrated in FIG. 1 or a different architecture. However, as discussed above, a processor throughput estimate relationship must be derived separately for each separate processor architecture. Accordingly, a relationship that provides an estimate of the throughput of each processor as a function of its L2 cache memory read miss rate and its L2 cache memory write miss rate is calculated for each of processors 702-708 and provided to the thread scheduler 710. Each processor also provides measurements of its L2 cache memory read and write miss rates to thread scheduler 710. For example, processor 702 sends its measured cache miss rate to thread scheduler 710 as indicated schematically by arrow 712. Similarly, processor 704 sends its measured cache miss rate to thread scheduler 710 as indicated schematically by arrow 716, processor 706 sends its measured cache miss rate to thread scheduler 710 as indicated schematically by arrow 720 and processor 708 sends its measured cache miss rate to thread scheduler 710 as indicated schematically by arrow 724. Based on the all of the cache miss information, thread scheduler 710 determines threads that will run one each of processors 702-708 and controls these processors as indicated schematically be arrows 714, 718, 722 and 726. In this manner, the overall throughput of the system is maximized.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different mechanisms could be used to obtain relationships between the measured ideal_IPC_mt value and the state values i_IPC other than the regression analysis as disclosed. Further, the calculations set forth above can also be used to estimate IPC throughput based on miss rates on several levels of the memory hierarchy. For example, the IPC throughput can be estimated based on L1 cache memory miss rates and that estimated IPC throughput can then be used as the "ideal" IPC used as the starting point of the estimation of throughput based on the next (L2) level of cache memory miss rates. In this manner, the estimate can be extended to lower levels of the hierarchy. The order of the process steps may also be changed without affecting the operation of the invention. Other aspects, such as the specific process flow, as well as other modifications to the inventive concept are intended to be covered by the appended claims.

What is claimed is:

1. A method for estimating throughput of a multithreaded processor having N threads based on a measured miss rate of a cache memory used by the processor, the method comprising:
    (a) calculating, based on the measured cache memory miss rate, a plurality of probabilities, including a probability that the processor is in a state with one thread running, a probability that the processor is in a state with two threads are running and continuing to a probability that the processor is in a state with all N threads running;
    (b) multiplying each probability calculated in step (a) by a throughput of the processor when it is in the corresponding state to obtain a product; and
    (c) summing products resulting from the multiplication in step (b).

2. The method of claim 1 wherein the probabilities calculated in step (a) are calculated assuming that a memory bus between the cache memory and a main memory has infinite bandwidth.

3. The method of claim 2 further comprising:
    (d) correcting the probabilities for delays on the memory bus.

4. The method of claim 1 wherein the cache memory is hierarchical with a first level and a second level and the probabilities calculated in step (a) are based on a measured miss rate of the second level of the cache memory.

5. The method of claim 4 wherein the probabilities calculated in step (a) are based on both a read miss rate and a write miss rate of the second level of the cache memory.

6. The method of claim 5 wherein the cache memory includes a write buffer and wherein step (a) comprises adjusting the write miss rate by using a multiplier whose value is based on a writes per cycle rate.

7. The method of claim 4 wherein the probability calculated in step (a) is based on a miss latency of the second level of the cache memory.

8. The method of claim 7 wherein the miss latency of the second level of the cache memory is corrected to account for write-back transactions.

9. The method of claim 1 wherein step (b) comprises determining the throughput of the processor when it is in a state with a number of threads running by fitting an equation to data relating the processor throughput to the number of threads running and an ideal processor throughput obtained with a cache memory of infinite size.

10. The method of claim 1 wherein step (a) comprises computing the probabilities with the formula $$P(i) = \binom{M}{i} * \text{prob\_running\_ind}^i * \text{prob\_blocked\_ind}^{M-i}$$

where i is the number of threads that are running in a processor state, $$\binom{M}{i}$$

is the number of ways i threads can be selected from M threads, prob_running_ind is the probability that a thread is running and prob_blocked_ind is the probability that a thread is blocked.

11. The method of claim 1 wherein step (b) comprises obtaining a product using the formula P(i)*i_IPC where i_PC is the throughput achieved in a processor state with i threads running and P(i) is the probability of being in that state.

12. The method of claim 1 wherein step (c) comprises summing products using the formula $$\text{IPC\_mt} = \sum_{i=0}^{M} P(i) * \text{i\_IPC}$$

where i_IPC is the throughput achieved in a with i threads running and P(i) is the probability of being in that state.

13. An apparatus for estimating throughput of a multi-threaded processor having N threads based on a measured miss rate of a cache memory used by the processor, the apparatus comprising:
    a hardware probability calculator that calculates, based on the measured cache memory miss rate, a plurality of probabilities, including a probability that the processor is in a state with one thread running, a probability that the processor is in a state with two threads are running and continuing to a probability that the processor is in a state with all N threads running;
    a hardware multiplier that multiplies each probability calculated by the probability calculator by a throughput of the processor when it is in the corresponding state, wherein the multiplier produces a plurality of resulting products; and
    a hardware adder that sums the resulting products.

14. The apparatus of claim 13 wherein the probability calculator calculates the plurality of probabilities assuming that a memory bus between the cache memory and a main memory has infinite bandwidth.

15. The apparatus of claim 14 further comprising a mechanism that corrects the probabilities for delays on the memory bus.

16. The apparatus of claim 13 wherein the cache memory is hierarchical with a first level and a second level and the probability calculator calculates the probabilities based on a measured miss rate of the second level of the cache memory.

17. The apparatus of claim 16 wherein the probability calculator calculates the probabilities based on both a read miss rate and a write miss rate of the second level of the cache memory.

18. The apparatus of claim 17 wherein the cache memory includes a write buffer and wherein the probability calculator adjusts the write miss rate by using a multiplier whose value is based on a writes per cycle rate.

19. The apparatus of claim 17 wherein the probability calculates the probabilities based on a miss latency of the second level of the cache memory.

20. The apparatus of claim 19 wherein the probability calculator corrects the miss latency of the second level of the cache memory to account for write-back transactions.

21. The apparatus of claim 13 wherein the throughput of the processor when it is in a state with a number of threads running that is provided to the multiplier is determined by fitting an equation to data relating the processor throughput to the number of threads running and an ideal processor throughput obtained with a cache memory of infinite size.

22. The apparatus of claim 13 wherein the probability calculator comprises a mechanism that computes the probabilities with the formula $$P(i) = \binom{M}{i} * \text{prob\_running\_ind}^i * \text{prob\_blocked\_ind}^{M-i}$$

where i is the number of threads that are running in a processor state, $$\binom{M}{i}$$

is the number of ways i threads can be selected from M threads, prob_running_ind is the probability that a thread is running and prob_blocked_ind is the probability that a thread is blocked.

23. The apparatus of claim 13 wherein the multiplier comprises a mechanism that produces a product using the formula P(i)*i_IPC where i_PC is the throughput achieved in a processor state with i threads running and P(i) is the probability of being in that state.

24. The apparatus of claim 13 wherein the adder comprises a mechanism that sums products using the formula $$\text{IPC\_mt} = \sum_{i=0}^{M} P(i) * \text{i\_IPC}$$

where i_IPC is the throughput achieved in a with i threads running and P(i) is the probability of being in that state.

25. An apparatus for estimating throughput of a multithreaded processor having N threads based on a measured miss rate of a cache memory used by the processor, the apparatus comprising:
means for calculating, based on the measured cache memory miss rate, a plurality of probabilities, including a probability that the processor is in a state with one thread running, a probability that the processor is in a state with two threads are running and continuing to a probability that the processor is in a state with all N threads running;
means for multiplying each probability calculated by the means for calculating by a throughput of the processor when it is in the corresponding state to obtain a product; and
means for summing products resulting from the means for multiplying.

26. The apparatus of claim 25 wherein the means for calculating comprises means for calculating the probabilities assuming that a memory bus between the cache memory and a main memory has infinite bandwidth.

27. The apparatus of claim 26 further comprising means for correcting the probabilities for delays on the memory bus.

28. The apparatus of claim 25 wherein the cache memory is hierarchical with a first level and a second level and the means for calculating comprises means for calculating the probabilities based on a measured miss rate of the second level of the cache memory.

29. The apparatus of claim 28 wherein the means for calculating comprises means for calculating the probabilities based on both a read miss rate and a write miss rate of the second level of the cache memory.

30. The apparatus of claim 29 wherein the cache memory includes a write buffer and wherein the means for calculating comprises means for adjusting the write miss rate by using a multiplier whose value is based on a writes per cycle rate.

31. The apparatus of claim 28 wherein the means for calculating comprises means for calculating the probabilities based on a miss latency of the second level of the cache memory.

32. The apparatus of claim 31 wherein the miss latency of the second level of the cache memory is corrected to account for write-back transactions.

33. A computer program product for estimating throughput of a multithreaded processor having N threads based on a measured miss rate of a cache memory used by the processor, the computer program product comprising a computer usable storage medium having computer readable program code thereon, including:
program code for calculating, based on the measured cache memory miss rate, a plurality of probabilities, including a probability that the processor is in a state with one thread running, a probability that the processor is in a state with two threads are running and continuing to a probability that the processor is in a state with all N threads running;
program code for multiplying each probability calculated by the program code for calculating by a throughput of the processor when it is in the corresponding state to obtain a product; and
program code for summing products resulting from the program code for multiplying.

* * * * *